Sept. 7, 1965 L. SCHWAB 3,204,392
AIR FILTER TERMINATING IN A COLLECTION POCKET
Filed Dec. 28, 1962
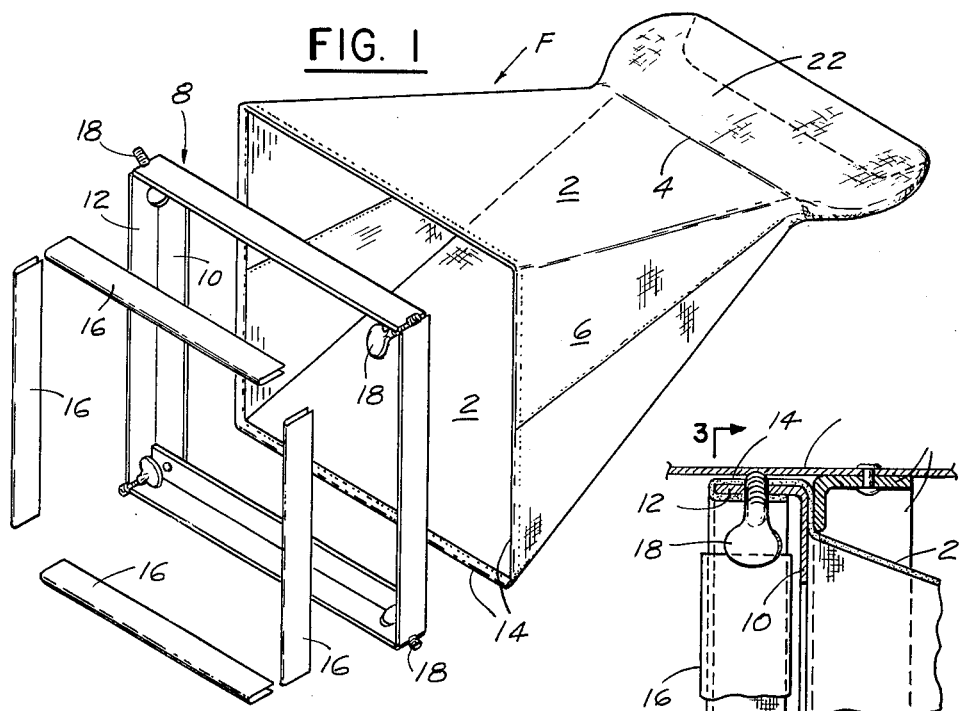
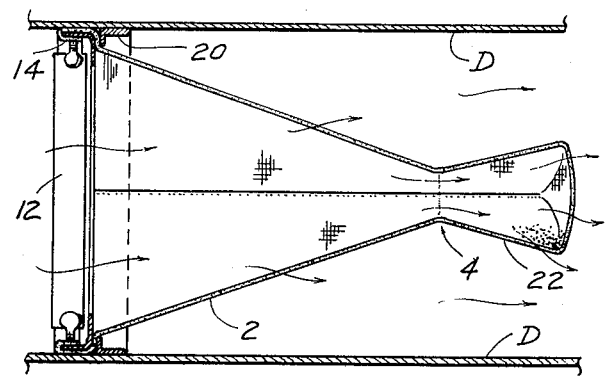
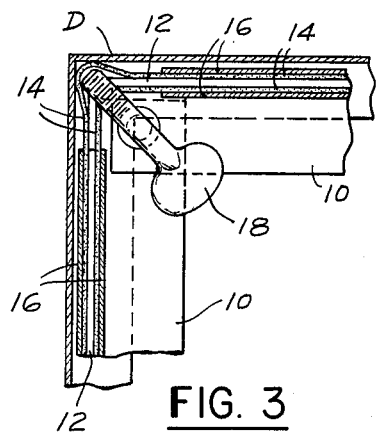
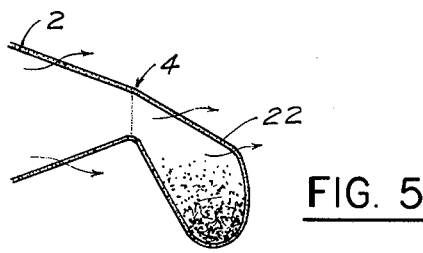
INVENTOR.
LOUIS SCHWAB
BY
ATTORNEYS

United States Patent Office 3,204,392
Patented Sept. 7, 1965

3,204,392
AIR FILTER TERMINATING IN A COLLECTION POCKET
Louis Schwab, P.O. Box 5146, Orlando, Fla.
Filed Dec. 28, 1962, Ser. No. 248,138
1 Claim. (Cl. 55—381)

This invention relates to the filtration of dust and other particles suspended in gases, and more particularly to the filters generally used in the air ducts of circulating air systems.

In the maintenance of circulating air systems for heating, cooling and ventilating, with regard to the replaceable filter units used in some such systems a major consideration favoring one filter construction over another is the effective life of the filter; that is, the length of service time after which replacement or cleaning of a filter unit is called for because it imposes too great a flow resistance and/or no longer effectively stops impurities in the stream. An ordinary filter of this type is composed of a fibrous barrier having interstices designed to impede the passage of a wide variety of atmospheric dust particles, many of which are in the less than five micron size range. Depending upon whether the filter tends more toward a pure sieve principle or an impingement-reaction principle, the interstices may variably be larger or smaller than the entrained particles. Regardless of the principle involved, it is well understood that the particle arrestance of the filter increases as it becomes clogged, but with concomitant sharply increasing rise in flow resistance. Eventually, however, dust will accumulate to the point where, due to a large pressure differential, dust particles possibly will be driven through the barrier. It is a combination of these factors of flow resistance and particle arrestance that determines the filter service life.

A further consideration is that the design velocity through the filter medium is typically in the range of 10 to 50 feet per minute depending, of course, on the particular medium. This naturally imposes other design limitations. In order to avoid undue enlargement of a duct (which would effect a reduction in velocity) filters commonly are corrugated, pleated or otherwise angularly disposed relative to the air stream to provide greater effective filtering area. One form of filter that has been proposed to provide large filter area, and which has proved highly suitable in terms of cost, convenience and effectiveness, has been a filter having a roughly pyramidal, conical or wedge-shaped type of tapered configuration.

The present invention constitutes an improvement in the last-mentioned type of filter unit, and is consistent with the generally universal objects in the art reflected in the above introductory discussion. The invention takes advantage of the fact that in a filter having such a tapered configuration the dust tends to travel toward and accumulate at the apex portion thereof. Briefly, in accordance with this invention the flow of air toward the apex portion is actually induced by a graduation or difference in permeability of a porous filtering medium between the base portion (the inlet end) and the apex portion. It has been found that by providing more open, more permeable filtering medium at said apex portion a filter unit of this type can remain in service efficiently for a longer period of time prior to necessary cleaning or replacement.

More particularly, in accordance with this invention, a novel feature comprises the formation of the filter body to achieve a trapping effect, in that the capacity for effective filtering is prolonged by providing adequate space for accumulating dust at the apex portion, with more gradual progressive reliance on the finer filter portion extending toward its open base.

Further objects, advantages and details of this invention will become evident from the following description of a preferred embodiment of the invention, in which:

FIGURE 1 is a perspective view of the filter and the frame parts (shown disassembled) for mounting of the filter in a duct.

FIGURE 2 is a vertical partial section taken longitudinally through the duct and showing the assembled relation of filter, frame parts and the duct.

FIGURE 3 is a cross-section taken as indicated by lines 3—3 in FIGURE 2.

FIGURE 4 is a longitudinal sectional view illustrating the pattern of air flow through the unit, and FIGURE 5 is an illustration of the dust collecting portion of the filter after it has been in service for a period of time sufficient to cause an accumulation of dust therein.

Filters constructed in accordance with the present invention are intended for use mainly in ducts of heating, cooling and ventilating systems. In such systems, filters typically are removably installed at the inlets or outlets of horizontal ducts, though it will be understood that other arrangements of these filters can be used. In the accompanying drawings a filter is generally indicated at F, and is illustrated in its application to a horizontal duct D having a substantially square cross-section.

Filter F is in the form of a structure or member having upper and lower walls designated 2 and vertical side walls designated 6, it being evident from FIGURES 1 and 4 that the upper and lower walls 2 are angularly inclined (an angle, for example, of approximately 30°) to the horizontal and converge toward a throat 4. Because it is mainly the upper and lower walls 2 that are tapered or convergent inwardly, as defined in a vertical-lengthwise section, the main body portion of the filter F is substantially wedge-shaped. However, the walls of the filter can be convergent in both vertical and horizontal planes, in which case this main body portion of the filter will have a substantially conical or pyramidal shape.

The means for securing the filter F in a duct comprises a frame 8 shaped to conform to the cross-section of the duct and constructed of right angle stock having legs 10 and 12. The peripheral edge 14 of the filter at its open base portion is folded inwardly in U-shaped fashion, being thereby specially adapted to receive the legs 12 at the sides of the frame as shown in FIGURE 2. When the peripheral filter edge 14 has been thus wrapped, in effect, around the frame, it is secured by retaining clips 16 each having an appropriately dimensioned U-shaped cross-section. The frame 8 and clips 16 may be formed of any fairly rigid material such as metal, plastic or pressed fiberboard. The complete assembly comprising filter F, frame 8 and clips 16 is fastened in place within a duct D by means of thumb screws 18 threaded in the corners of frame 8. If desired, the duct D can be provided with a flange 20 constituting an abutment to limit downstream movement of the filter unit within the duct. The flange 20 also serves as a further means for clamping the filter material in frame 8.

As previously mentioned, in a filter having a substantially triangular cross-section, as in the present case, the dust tends to accumulate first at the downstream apex portion and progressively to accumulate backwardly toward the open base portion in the course of time.

An important feature of the filter F disclosed herein is a slightly divergent pocket 22 extending from the throat 4 in extension of walls 2 and 6. As will be evident particularly from FIGURE 5, pocket 22 is ideally adapted to trap and collect dust particles which are impeded in their progress by the filter material.

The porous material from which filter F is formed may comprise a shaped fabric treated if desired, to improve its rigidity and/or particle arrestance qualities. Additionally, the filter material may include natural or synthetic fibers applied or otherwise incorporated in the fabric backing. Examples of usable fibers are cotton, hair, glass, nylon, rayon and some acrylic compositions.

In making the filter F, instead of using a porous material providing uniform permeability throughout the filter, according to the invention, the pocket 22 has a course, open texture and the rearwardly located main body walls 2 and 6 have a finer, closer texture. That is, the interstices in the meshed construction of the material forming pocket 22 afford greater permeability to air than the interstices of the material located rearwardly from throat 4 toward the open base portion. The pocket portion 22 may vary in size, as desired, to balance out the entire filter unit.

It has been determined that in service a filter constructed in accordance with this invention should have a life, prior to cleaning or replacement, which is considerably longer than the life of an ordinary filter having approximately the same surface area. Because of the more permeable nature of the filter F at its apex, and the incorporation of dust collecting pocket 22 extending beyond throat 4, air is induced to flow through throat 4 and a proportionally greater quantity of accumulated dust is concentrated in pocket 22. As dust accumulates on the more permeable filter material at the apex, the filtering action thereof will, of course, be increased due to clogging, but eventually the greater filtering action will be performed by the less permeable material located rearwardly of throat 4. However, by virtue of the features described, this filter operates efficiently for a longer period of time and collects a greater quantity of dust than other filters.

It will be understood that various departures from the specifically disclosed embodiment of the invention can be made without departing from the scope thereof as defined by the following claim:

I claim:

A filter for use in separating entrained particles carried by an air stream comprising:

(1) a first hollow member constituted of air permeable filtering material and having an upstream open end of a first cross-sectional area and an axially disposed downstream throat of a second cross-sectional area substantially less than said first cross-sectional area, said member having wall portions uniformly tapering from said upstream open end to said downstream throat, and (2) a second hollow member constituted of filtering material of a greater permeability than the filtering material of said first hollow member, said second hollow member being connected to said first hollow member in axial alignment therewith and having an upstream open end in communication with said throat and a downstream closed end of a larger cross-sectional area than the cross-sectional area of said second member open end, said second member having wall portions uniformly expanding from said second member open end to said downstream closed end, said second member having a major axis disposed transversely of the longitudinal axis of said first member, said major axis being longer than the width of said throat measured on a line parallel to said major axis, and said second member having a minor axis substantially shorter than said major axis.

References Cited by the Examiner

UNITED STATES PATENTS

| | | | |
|---|---|---|---|
| 824,683 | 6/06 | Chestnutt | 55—364 XR |
| 1,363,753 | 12/20 | Quinn | 55—380 |
| 1,448,322 | 3/28 | Wirls | 55—364 XR |
| 2,577,863 | 12/51 | Sosnowich | 55—382 X |
| 2,774,443 | 12/56 | Slayter | 55—341 XR |
| 2,804,166 | 8/57 | Stevens et al. | 55—367 |
| 2,853,154 | 9/58 | Rivers | 55—376 X |
| 2,964,127 | 12/60 | Korn | 55—382 XR |

FOREIGN PATENTS

| | | |
|---|---|---|
| 575,846 | 4/24 | France. |
| 890,415 | 9/53 | Germany. |
| 817,011 | 7/59 | Great Britain. |

ROBERT F. BURNETT, *Primary Examiner.*

HARRY B. THORNTON, *Examiner.*